Patented Nov. 28, 1944

2,363,498

UNITED STATES PATENT OFFICE 2,363,498

MANUFACTURE OF PRECIPITATED CATALYSTS

Robert E. Burk and Everett C. Hughes, Cleveland Heights, Ohio, assignors to The Standard Oil Company, Cleveland, Ohio, a corporation of Ohio No Drawing. Application December 26, 1939, Serial No. 311,008

11 Claims. (Cl. 252—254)

Precipitated catalysts or catalysts involving primarily a colloidal or gel structure are under the fundamental disadvantage of being very difficult to sufficiently wash free of by-product ions formed in the precipitation, since these tend to be held in adsorbed relation quite tenaciously, and the fixed alkalies have been particularly disadvantageous in process usage, on this account. Preparation of high efficiency catalysts has accordingly required materials of such character that in the large amounts required for commercial scale operations on such materials as hydrocarbons, alcohols, etc. in processes involving molecular change such as aromatizing, the cost has tended to be rather high. We have found that in precipitated catalyst preparation as heretofore known where the catalyst has been precipitated and then washed and dried, thorough washing at such stage is detrimental to the gel structure before such structure is really sufficiently established, and the amount of washing requisite to eliminate adsorbed ions to a practical degree is such as to result in a materially deteriorated catalyst from this stage. In accordance with the present invention however, it now becomes possible to make precipitated catalysts without damage from the washing; and it is further possible to successfully employ material which ordinarily otherwise would result in inferior catalysts or be impossible of desirable standards of operation.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In accordance with our invention, a catalyst precipitated in colloidal or gel form initially, is not subjected to the drastic washing of the fresh precipitate as customarily heretofore known, but the precipitate is merely lightly washed and is then dried. The structure of the catalyst being established thus without damage from much washing, the dried catalyst is now subjected to a thorough washing, and this may be carried out completely without detriment to the structure. Catalysts precipitated in colloidal form, irrespective of their chemical composition, whether of one constituent or mixed catalyst type, are thus cleared of interfering adsorbed ions; and catalysts of the mixed character as with chromium and aluminum precipitated catalysts and the like are particularly satisfactorily produced. In the improved elimination of by-product ions, fixed alkali compounds can be employed with highly desirable results, and the precipitation of the catalyst hydroxides may be brought about, very advantageously we have found by alkali aluminates.

Where a chromium containing catalyst is to be formed, the chromium compound initially employed may be any desired one, some having advantages over others in cost. The acetate is advantageous from an operating standpoint, although such salts as the nitrate, sulphate, etc. can be used if the acetate ion is added, acetic acid or ammonium or sodium acetate, etc., and chromic anhydride may also advantageously be employed as starting material. This may be converted into desired chromium salts. Chromium chloride can be used, but adsorbed chlorine ions if not well eliminated may occasion a more or less transient poison in the catalyst.

One particularly desirable way of preparing the chromium salt is to react chromic anhydride or sodium dichromate with an acid, such as sulphuric acid, and then add a reducing agent as methanol, ethanol, or similar alcohol, or other reducing agent. The resulting chromic sulphate solution thus formed may then be treated with calcium acetate. Calcium sulphate which is thrown out, is filtered off, and the chromic acetate solution is ready for precipitation. Other ways of preparing a chromium salt solution are of course available.

The precipitant preferred, the alkali aluminate, may be prepared in various ways. Particularly desirable is for instance heating concentrated solutions of sodium hydroxide (above 60 per cent) to 300° F., plus or minus 50° F. with a chemically equivalent amount of bauxite. The melt in concentrated form, is poured into water, and desirably should be used rather promptly for the precipitating since such solutions are not stable for long periods unless an excess of caustic soda is used, and this is undesirable. If the bauxite contains impurities such as iron, the aluminate solution may be filtered to eliminate such. Other ways of preparing the aluminate solution may involve use of sodium hydroxide, potassium hydroxide or carbonates or quaternary alkyl ammonium hydroxides may be used, although the reaction with bauxite should be carried out at a lower temperature with the latter. Aluminum metal may be dissolved in alkalies, or soluble aluminum salts may be treated with alkali.

As pointed out in our co-pending patent application Serial No. 262,492, there is a peculiar critical character if the chromium be in amount to 18 and 30 per cent in a composition of aluminum, and as a feature of the present invention we can particularly conveniently precipitate a catalyst in this very range, by taking the precaution to precipitate by reaction of a neutral alkali aluminate solution and a neutral chromium salt solution. In cases where more aluminum is desired, an equivalent amount of acid, such as sulphuric, acetic, etc., is added to the chromium salt solution. On the other hand where a higher chromium content is desired, an excess of alkali is added to the aluminate solution. Precipitation by aluminate solution thus makes possible the additional feature of control of the ultimate composition of the catalyst. The two solutions, the chromium salt solution and the aluminate solution are mixed for the precipitation. While the mixing may be carried out in various ways, particularly desirable results are obtained by flowing the solutions in the proportions desired, into a small highly agitated zone, whence the suspension of hydroxide precipitate is allowed to stand for some time, for instance more than four hours, and then the water is removed by filtration. The precipitate need not be washed. Or one wash with about an equal amount of water may be given, and then the precipitate be filtered, or in any event the amount of washing at this state should be moderate. The precipitate is now submitted to drying, and this should be thorough. Thus, it may be dried for sixty hours or more in air, at elevated temperature but below the boiling point of water, for instance at about 60° C., and this is desirably followed by several hours drying, for instance up to about sixteen, at still higher temperature, such as about 205° C., preferably in a vacuum. The dried catalyst may now be washed, and adsorbed ions, alkali, sulphate, etc. can now be washed out. The thorough removal of these impurities thus possible, greatly improves the activity of the catalyst.

As an example, an 80 Al:20 Cr oxide catalyst may be prepared as follows:

Sodium dichromate 39.6 parts, and 97 per cent sulphuric acid 101 parts, are dissolved in about 400 parts of water. Ethyl alcohol about 19 parts is added, and the temperature is maintained at 40–70° C. until all of the dichromate is converted to chromic sulphate. Calcium acetate about 140 parts in about 400 parts of water is added and the precipitated calcium sulphate is filtered off. The solution of chromium acetate and acetic acid is then diluted up to about 5000 parts with water.

Sodium hydroxide 64 parts, is heated with powdered bauxite about 111 parts, to 177° C. After about ten minutes the melt is poured into about 11,000 parts of water to give a solution of sodium aluminate.

The two solutions are flowed together into a small mixing zone provided with vigorous agitation, and thence the mixture is allowed to stand about four hours. The water is filtered off, and the precipitate is re-mixed with about 16,000 parts of water and is filtered. The precipitate is dried at 60° C. for at least sixty hours in air, and about sixteen hours at 205° C. in vacuum. The dried particles are next washed about twenty times, using about 200 parts of water each time. The precipitate is then again dried at 205° C., under vacuum.

Catalysts made in accordance with the invention may be employed for example for aromatizing hydrocarbons, for instance pure hydrocarbons and higher members of the series, through hexane, heptane, octane, etc., naphthas or distillates from petroleum stocks which are predominantly non-benzenoid, as for instance derived from Pennsylvania, Michigan, Ohio, Kentucky, Mid-Continent and the like oils, and the reaction of the hydrocarbon on the contact catalyst may be carried out at a temperature between 375 and 675° C., most desirably around 500° C., the feed rate or space-velocity depending somewhat upon the operating temperature, and being for instance 0.1 up to 10 liters of liquid per liter of catalyst, or desirably around 1 liter of liquid naphtha per hour per liter of catalyst. The catalyst may be regenerated in situ by supplying thereto at a temperature of 400–680° C. an oxygen-containing gas such as air or oxygen diluted with an inert gas such as nitrogen. The regenerating gas is preferably dried. At intervals of one to three weeks the catalyst may be reactivated by regenerating at 650–700° C.

Catalysts prepared from chromium nitrate or other chromium salt, or other metals, and aluminate of sodium or potassium thus show generally similar properties, and we have found that the thorough washing of the catalyst which is now made possible without damaging the catalyst structure, results in much better catalyst efficiency.

Other modes of applying the principle of the invention may be employed, change being made as regards the details described, provided the features stated in any of the following claims, of the equivalent of such, be employed.

I therefore particularly point out and distinctly claim as my invention:

1. In a process of making a precipitated catalyst, mixing a solution of chromium acetate and a solution of a melt of sodium hydroxide and bauxite, separating out the precipitate, adding water thereto and filtering, drying the precipitate at about 60° C. in air for at least sixty hours and then at a higher temperature for several hours under vacuum, then washing the dried precipitate thoroughly, and re-drying.

2. In a process of making a precipitated catalyst, mixing a solution of chromium acetate and a solution of sodium aluminate, separating out the precipitate, adding water thereto and filtering, drying the precipitate at about 60° C. in air for at least sixty hours and then at a higher temperature for several hours under vacuum, then washing the dried precipitate thoroughly, and re-drying.

3. In a process of making a precipitated catalyst, mixing a solution of chromium acetate and a solution of an alkali aluminate, separating out the precipitate, drying the precipitate in air at elevated temperature below the boiling point of water for many hours, and then at a higher temperature under vacuum, then washing the dried precipitate thoroughly, and redrying.

4. In a process of making a precipitated catalyst, mixing a solution of chromium acetate with a solution of an alkali aluminate, washing the precipitate slightly, drying the precipitate in air at elevated temperature below the boiling point of water for many hours, and then at a higher temperature under a vacuum for several hours, then washing the dried catalyst throughly, and drying.

5. In a process of making a precipitated catalyst, reacting a chromic salt with an alkali aluminate in solution, providing presence of an acetate ion, washing the precipitate slightly, drying the precipitate in air at elevated temperature below the boiling point of water for many hours, and then at a higher temperature under a vacuum for several hours, then washing the dried catalyst thoroughly, and drying.

6. In a process of making a precipitated catalyst, reacting chromium salt solution with an alkali aluminate solution, washing the precipitate slightly, drying the precipitate in air at elevated temperature below the boiling point of water for many hours, and then at a higher temperature under a vacuum for several hours, then washing the dried catalyst thoroughly, and drying.

7. In a process of making a precipitated catalyst, reacting chromic sulphate with an alkali aluminate in the presence of an acetate ion, in solution, separating the precipitate and washing slightly, drying the precipitate in air at elevated temperature below the boiling point of water and then at a higher temperature under vacuum, then washing the dried catalyst thoroughly, and re-drying.

8. A process of making a precipitated catalyst suitable for use in the catalytic treatment of hydrocarbons and formed of chromium and aluminum oxides, which comprises reacting a chromic salt with an alkali aluminate in solution in the presence of an acetate ion, separating the resulting precipitate, and drying the same.

9. A process of making a precipitated catalyst suitable for use in the catalytic treatment of hydrocarbons and formed of chromium and aluminum oxides with the former in the proportion of 18 to 30 mol per cent, which comprises reacting a chromic salt with an alkali aluminate in solution in amounts to provide the above mentioned proportions and in the presence of an acetate ion, separating the resulting precipitate, drying the precipitate, washing the dried precipitate, and re-drying the same.

10. A process of making a precipitated catalyst suitable for use in the catalytic treatment of hydrocarbons and formed of chromium and aluminum oxides with the former in the proportion of 18 to 30 mol per cent, which comprises reacting a chromic salt with an alkali aluminate in solution in amounts to provide the above mentioned proportions and in the presence of an acetate ion, and separating the resulting precipitate.

11. A process of making a precipitated catalyst suitable for use in the catalytic treatment of hydrocarbons and formed of chromium and aluminum oxides with the former in the proportion of 18 to 30 mol per cent, which comprises reacting chromium acetate and an alkali aluminate in an aqueous solution in amounts to provide the above mentioned proportions, and separating the resulting precipitate.

ROBERT E. BURK.
EVERETT C. HUGHES.

---

CERTIFICATE OF CORRECTION.

Patent No. 2,363,498.　　　　　　　　　　　　　　November 28, 1944.

ROBERT E. BURK, ET AL.

It is hereby certified that error appears in the printed specification of the above numbered patent requiring correction as follows: Page 3, first column, line 10, claim 6, after the word "reacting" insert --a neutral--; and that the said Letters Patent should be read with this correction therein that the same may conform to the record of the case in the Patent Office.

Signed and sealed this 20th day of February, A. D. 1945.

Leslie Frazer (Seal)　　　　　　　　　　　　　　Acting Commissioner of Patents.

lyst, reacting a chromic salt with an alkali aluminate in solution, providing presence of an acetate ion, washing the precipitate slightly, drying the precipitate in air at elevated temperature below the boiling point of water for many hours, and then at a higher temperature under a vacuum for several hours, then washing the dried catalyst thoroughly, and drying.

6. In a process of making a precipitated catalyst, reacting chromium salt solution with an alkali aluminate solution, washing the precipitate slightly, drying the precipitate in air at elevated temperature below the boiling point of water for many hours, and then at a higher temperature under a vacuum for several hours, then washing the dried catalyst thoroughly, and drying.

7. In a process of making a precipitated catalyst, reacting chromic sulphate with an alkali aluminate in the presence of an acetate ion, in solution, separating the precipitate and washing slightly, drying the precipitate in air at elevated temperature below the boiling point of water and then at a higher temperature under vacuum, then washing the dried catalyst thoroughly, and re-drying.

8. A process of making a precipitated catalyst suitable for use in the catalytic treatment of hydrocarbons and formed of chromium and aluminum oxides, which comprises reacting a chromic salt with an alkali aluminate in solution in the presence of an acetate ion, separating the resulting precipitate, and drying the same.

9. A process of making a precipitated catalyst suitable for use in the catalytic treatment of hydrocarbons and formed of chromium and aluminum oxides with the former in the proportion of 18 to 30 mol per cent, which comprises reacting a chromic salt with an alkali aluminate in solution in amounts to provide the above mentioned proportions and in the presence of an acetate ion, separating the resulting precipitate, drying the precipitate, washing the dried precipitate, and re-drying the same.

10. A process of making a precipitated catalyst suitable for use in the catalytic treatment of hydrocarbons and formed of chromium and aluminum oxides with the former in the proportion of 18 to 30 mol per cent, which comprises reacting a chromic salt with an alkali aluminate in solution in amounts to provide the above mentioned proportions and in the presence of an acetate ion, and separating the resulting precipitate.

11. A process of making a precipitated catalyst suitable for use in the catalytic treatment of hydrocarbons and formed of chromium and aluminum oxides with the former in the proportion of 18 to 30 mol per cent, which comprises reacting chromium acetate and an alkali aluminate in an aqueous solution in amounts to provide the above mentioned proportions, and separating the resulting precipitate.

ROBERT E. BURK.
EVERETT C. HUGHES.

---

CERTIFICATE OF CORRECTION.

Patent No. 2,363,498.                                November 28, 1944.

ROBERT E. BURK, ET AL.

It is hereby certified that error appears in the printed specification of the above numbered patent requiring correction as follows: Page 3, first column, line 10, claim 6, after the word "reacting" insert --a neutral--; and that the said Letters Patent should be read with this correction therein that the same may conform to the record of the case in the Patent Office.

Signed and sealed this 20th day of February, A. D. 1945.

Leslie Frazer (Seal)                                Acting Commissioner of Patents.